United States Patent
Dvorak et al.

[19]

[11] Patent Number: 6,158,544
[45] Date of Patent: Dec. 12, 2000

[54] STEERING SYSTEM FOR AN ARTICULATED MACHINE

[75] Inventors: Paul A. Dvorak, Kewanee; Paul E. Jantz, Crest Hill; Bryan A. Vogt, Romeoville; Steven R. Wells, Aurora, all of Ill.

[73] Assignee: Caterpillar Inc., Peoria, Ill.

[21] Appl. No.: 09/150,272

[22] Filed: Sep. 9, 1998

Related U.S. Application Data

[60] Provisional application No. 60/058,705, Sep. 12, 1997.

[51] Int. Cl.[7] ................................................. B62D 13/00
[52] U.S. Cl. .......................... 180/418; 180/420; 180/441
[58] Field of Search ................................... 180/418, 420, 180/441; 280/771, 773; 137/625.21, 636.1

[56] References Cited

U.S. PATENT DOCUMENTS

| | | | |
|---|---|---|---|
| 4,057,158 | 11/1977 | Lissy | 214/330 |
| 4,700,794 | 10/1987 | Bernhagen et al. | 180/6.44 |
| 4,951,712 | 8/1990 | Becker | 137/636.1 |
| 4,955,442 | 9/1990 | Crabb et al. | 180/6.44 |
| 5,042,314 | 8/1991 | Rytter et al. | 74/335 |
| 5,085,245 | 2/1992 | Grove | 137/454.5 |
| 5,365,803 | 11/1994 | Kelley et al. | |
| 5,411,110 | 5/1995 | Wilson et al. | 180/247 |
| 5,489,005 | 2/1996 | Marcott | 160/134 |
| 5,520,262 | 5/1996 | Marcott | 180/418 |
| 5,579,863 | 12/1996 | Nelson et al. | 180/418 |
| 5,752,578 | 5/1998 | Kellogg | 180/414 |
| 5,934,320 | 8/1999 | O'Reilly et al. | 137/625.21 |
| 5,979,504 | 11/1999 | Spivey et al. | 137/636.1 |

*Primary Examiner*—J. J. Swann
*Assistant Examiner*—L. Lum
*Attorney, Agent, or Firm*—William C. Perry; James R. Smith

[57] ABSTRACT

In articulated machines it has long been a desire to provide a steering system that will permit the incorporation of machine controls into a steering wheel assembly and yet provide the operator with mechanical feedback through the steering wheel. The present invention accomplishes this goal by providing a steering wheel assembly on a first frame of the machine and a control valve on the second frame that articulates with respect to the first. The steering wheel assembly and control valve are connected by a shaft assembly that includes a pair of constant velocity U-joints interposed along the length thereof. The shaft assembly translates substantially equal amounts of rotation between the steering wheel assembly and the control valve. The control valve is operable in a first and second condition, depending upon the amount of rotation of the steering wheel assembly, to provide different modes of steering that compliment the operation of the machine.

22 Claims, 8 Drawing Sheets

Fig_1_

Fig_6_

STEERING SYSTEM FOR AN ARTICULATED MACHINE

This application claims the benefit of prior provisional patent application Ser. No. 60/058,705 filed Sep. 12, 1997.

TECHNICAL FIELD

This invention relates generally to a steering system for an articulated machine and more particularly to a steering system that provides a mechanical feedback to the steering wheel.

BACKGROUND ART

In the operation of articulate machines, it is common to use a steering mechanism that includes a pair of hydraulic cylinders that are connected between the front and rear frames of the machine on opposing sides of an articulation point. The steering cylinders may be selectively actuated to extend one and retract the other to pivot the front frame with respect to the rear frame to affect a steering maneuver.

Control of the pressurized fluid to the steering cylinders has been accomplished in several different ways. Many steering systems utilized a hand metering unit (HMU) that is connected to the steering wheel and will pump fluid to the steering cylinders in response to rotation of the steering wheel. While this has been known to work effectively, it has been known to cause operator fatigue when operating a machine such as a wheel loader that requires excessive maneuvering.

Attempts to improve upon this system have included the addition of electronic controls that may be incorporated into a steering control other than a steering wheel, such as a handle and lever. This not only reduces the fatigue of the operator, it allows the incorporation of other machine functions, such as transmission controls into the lever. This type of control has been incorporated in the operation of machines such a wheel loaders that are utilized to move material from one location to another, often times by loading the material into an adjacent truck. While this type of control works quite well in truck loading applications, it has been known to exhibit some minor drawbacks when moving material from one site to another utilizing an operation commonly known as "roading".

Other improvements in articulated steering have incorporated the electronic transmission controls into a steering wheel that rotates through a relatively small range, thus allowing the transmission controls to remain incorporated in the steering wheel. The steering wheel is connected to a hydraulic control valve that is mounted on the front frame that articulates with respect to the rear frame upon which the steering wheel is mounted. The connection between the steering wheel and control valve utilizes a pair of U-joints that are positioned in a particular phase with respect to one another to create a mechanical modulation of the control valve as the respective frames articulate. In doing so, the operator is afforded a mechanical feedback as the machine is steered. In addition, the response of the machine is such that initial movements of the steering wheel from its neutral position result in smaller amounts of response at the control valve than what is experienced when the machine is articulated. This has been known to provide a steering system that is much less "jerky" during "roading" operations and is more responsive with less amounts of steering wheel rotation during truck loading operations. While this has been quite successful in the operation of larger wheel loaders, the mechanical modulation is not quite as effective or comfortable for the individual operating smaller wheel loaders that may be operated on highways at higher speeds.

The present invention is directed to overcoming one or more of the problems as set forth above.

DISCLOSURE OF THE INVENTION

In one aspect of the present invention, a steering system is adapted for use with an articulated machine. The machine has first and second frame members that are mounted for pivoting movement relative to one another in response to movement of at least one fluid actuator that is connected therebetween. The steering system includes a steering control member that is rotatably mounted on the first frame member. A control valve is mounted on the second frame member and is operable in one of a first and second condition upon rotation of the steering control member to selectively control the movement of the fluid actuator. A shaft assembly is included that has a first end portion connected to the steering control member and a second end portion connected to the control valve. The shaft assembly has a pair of constant velocity U-joints interposed between the end portions thereof. The U-joints are adapted to accommodate the angular change between the two frame members as they are moved with respect to one another. During this angular change, a rotation ratio of approximately 1:1 between the first and second end portions of the shaft assembly is maintained.

In another aspect of the present invention, a steering system for an articulated machine is provided that includes a first frame member and a second frame member that is pivotally mounted to the first frame member for relative movement with respect thereto. At least one fluid actuator is connected between the first and second frame members and is moveable to cause the relative movement between the frame members to provide steering for the machine. A steering wheel is rotatably mounted on the first frame member. A shaft assembly is included that has first and second end portions, with a steering wheel being mounted on the first end portion thereof. A pair of constant velocity U-joints is interposed in spaced relationship between the first and second end portions of the shaft assembly. A control valve is mounted on the second frame member that has a rotary actuator that is adapted for connection to the second end portion of the shaft assembly. The control valve is operable in a first condition wherein pressurized fluid is communicated to the fluid actuator under a first preselected mode upon rotation of the steering wheel in a first preselected range of rotation. The control valve also operates in a second condition wherein pressurized fluid is communicated to the fluid actuator under a second preselected mode upon rotation of the steering wheel in a second preselected range of rotation.

In yet another aspect of the present invention, a steering system is provided for an articulated machine that includes first and second frame members that are pivotally mounted to one another for relative movement with respect to one another. At least one fluid actuator is connected between the first and second frame members and is moveable to cause the relative movement between the frame members to provide steering for the machine. A steering wheel is mounted on the first frame while a control valve is mounted on the second frame. The control valve has a rotary actuator and is operable in one of a first and second condition. In the first condition, pressurized fluid is communicated to the fluid actuator within a first range of pressure. In the second condition, pressurized fluid is communicated to the fluid actuator within a second range of pressure that is greater than that of the first range. A shaft assembly is included that has a first end portion connected to the steering wheel by a first constant velocity U-joint and a second end portion connected to the rotary actuator of the control valve by a second constant velocity U-joint. The shaft assembly is operable to translate rotation of the steering wheel into rotation of the rotary actuator in a manner wherein the amount of rotation of the steering wheel is substantially equal to that of the rotary actuator.

With the steering system set forth above, the fluid actuators that extend between the frame members of an articulated machine may be controlled by a steering wheel that requires a relatively small amount of overall rotation between its maximum positions. The connection between the steering wheel and the actuation within the control valve permit modulation of the pressurized fluid to the steering cylinders such that only a small amount of pressurized fluid is directed to the steering cylinders during the initial portion of rotation of the steering wheel to allow for subtle changes in articulation. This is very conducive for operation under relatively high speeds. Alternatively, the modulation of the control valve upon the greater portions of steering wheel rotation permits the application of increased flow of pressurized fluid to the steering cylinders to achieve greater movement thereof when operating the machine in confined loading situations. This steering system ultimately provides control for the machine that is extremely versatile in all phases of machine operation and yet reduces the fatigue normally experienced by a machine operator.

BEST MODE FOR CARRYING OUT THE INVENTION

Figure 1:
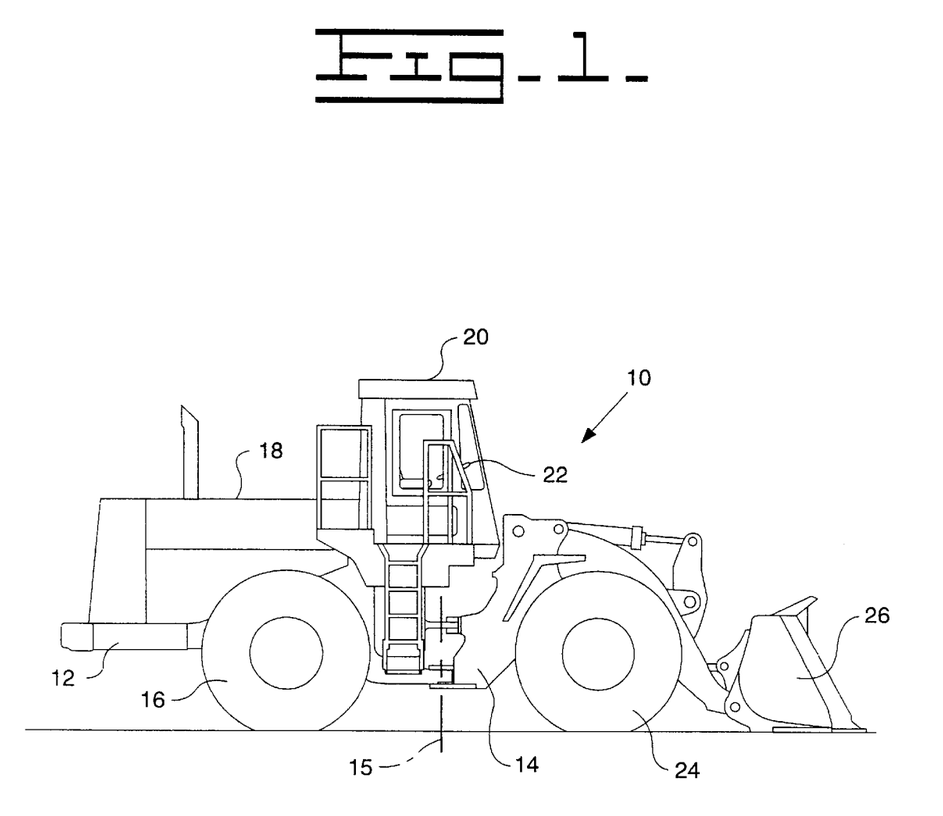
FIG. 1 is a diagrammatic side view of a machine the embodies the principles of the present invention.

Referring to the drawings, a machine 10 is shown to have first and second frame members 12 and 14 respectively, that are mounted to one another for pivoting movement about a substantially vertical axis 15. The first or rear frame member provides support for a pair of wheels 16 (one shown in FIG. 1) that are positioned on opposite sides of the machine and an engine enclosure 18 housing an engine (not shown) that provides drive to the wheels 16. An operator station 20 is mounted to the rear frame 12 and houses a plurality of controls that are utilized to operate the machine. Among the controls is a steering control member such as a steering wheel assembly 22 that is normally supported by a console (not shown) that is in turn supported by the operator station.

The second or front frame member 14 also supports a pair of wheels 24 (one shown in FIG. 1) that are positioned on opposite sides of the machine. Normally, although not specifically shown in the drawings, a machine such as the wheel loader shown in FIG. 1, also provides drive from the engine to the front wheels 24. A work implement, such as bucket 26 is mounted on the front frame of the machine and is moveable in a substantially vertical plane to load and deposit material in a well known manner. The controls for operating the work implement are also located within the operator's station.

Figure 2:
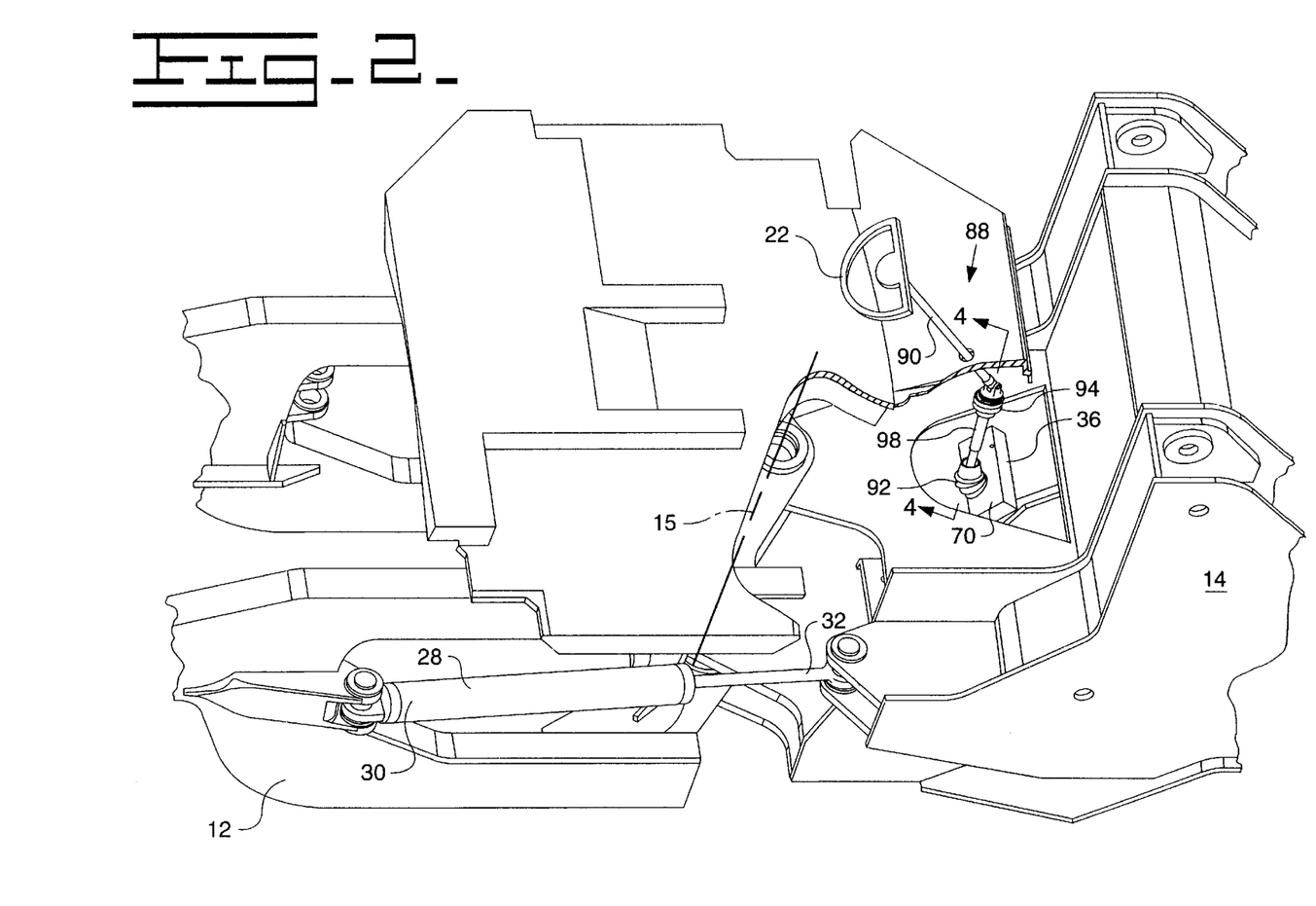
FIG. 2 is a diagrammatic perspective view of the front and rear frame members of the machine shown in FIG. 1 with portion of the frame members broken away to more clearly show the invention.

A pair of fluid actuators, or hydraulic steering cylinders 28 (one shown), are mounted between the frame members 12 and 14 on opposite sides of a longitudinal centerline 29 (FIGS. 6–8) that runs the length of the machine. The steering cylinders may be actuated to pivot the front frame member with respect to the rear frame member on either side of the longitudinal centerline to provide steering of the machine. A first end portion 30 of the steering cylinder 28 is connected to the rear frame member 12 while a second end portion 32 is connected to the front frame portion as can best be seen in FIG. 2. While not shown in the drawings, the other steering cylinder is mounted on the opposite side of the machine in an identical manner.

A fluid control means, generally indicated at 34, is provided to sequentially control the flow of pressurized fluid to the steering cylinders 28 so that one of the steering cylinders is extended while the other is retracted in a manner to be described in greater detail hereinafter. The fluid control means includes a control valve 36 that is mounted on the front frame 14 for movement therewith. In the instant embodiment the control valve 36 is shown as being a pilot valve that directs pilot pressure from an engine driven pump 38 to a steering valve 40. The steering valve 40 is in turn connected to the steering cylinders by a pair of conduits that extend from the respective head and rod ends of each steering cylinder in a well known manner. Operation of the steering valve in response to the pilot pressure will direct the flow of pressurized fluid from a main system pump (not shown) to the steering cylinders in a well known manner to cause the sequential operation thereof, i.e. extending one cylinder while retracting the other. The pilot system is shown schematically in FIG. 3.

The control valve 36 includes a directional control portion in the form of a rotary actuator 42, a pressure regulating valve 44 having a valve spool 46 movable in a rectilinear direction and an actuator 48 for mechanically imparting rectilinear movement of the valve spool 46 when the rotary actuator 42 is moved in either direction from a neutral position. The rotary actuator 42 includes a pair of control ports 50 and 52 connected to the steering valve 40, a drain port 54 connected to a tank 56 and an input passage 58. The rotary actuator 42 has a neutral position at which the control ports 50, 52 communicate with the drain port 54 and are blocked from the input passage 58. When the rotary actuator is moved in a clockwise direction as viewed in FIG. 3, communication is established between the input passage 58 and the control port 50 through a flow path 60 while maintaining communication between the control port 52 and the drain port 54 through a flow path 62. Similarly, movement of the rotary actuator 42 in a counterclockwise direction establishes communication between the inlet passage 58 and the control port 52 through a flow path 64 while maintaining communication between the control port 50 and the drain port 54 through a flow path 66.

For illustrative purposes, the control valve has been described as being a pilot valve that communicates pilot pressure to the steering valve which in turn directs system pressure and flow to the respective steering cylinders. It is to be understood that the control valve could be in direct communication with the engine driven pump, and that either system would be acceptable without departing from the principles of the present invention. In either instance, the flow of the pressurized fluid (pilot or system pressure) is dictated by the rotary actuator 42 that is mounted for rotation within the control valve 36.

Figure 3:
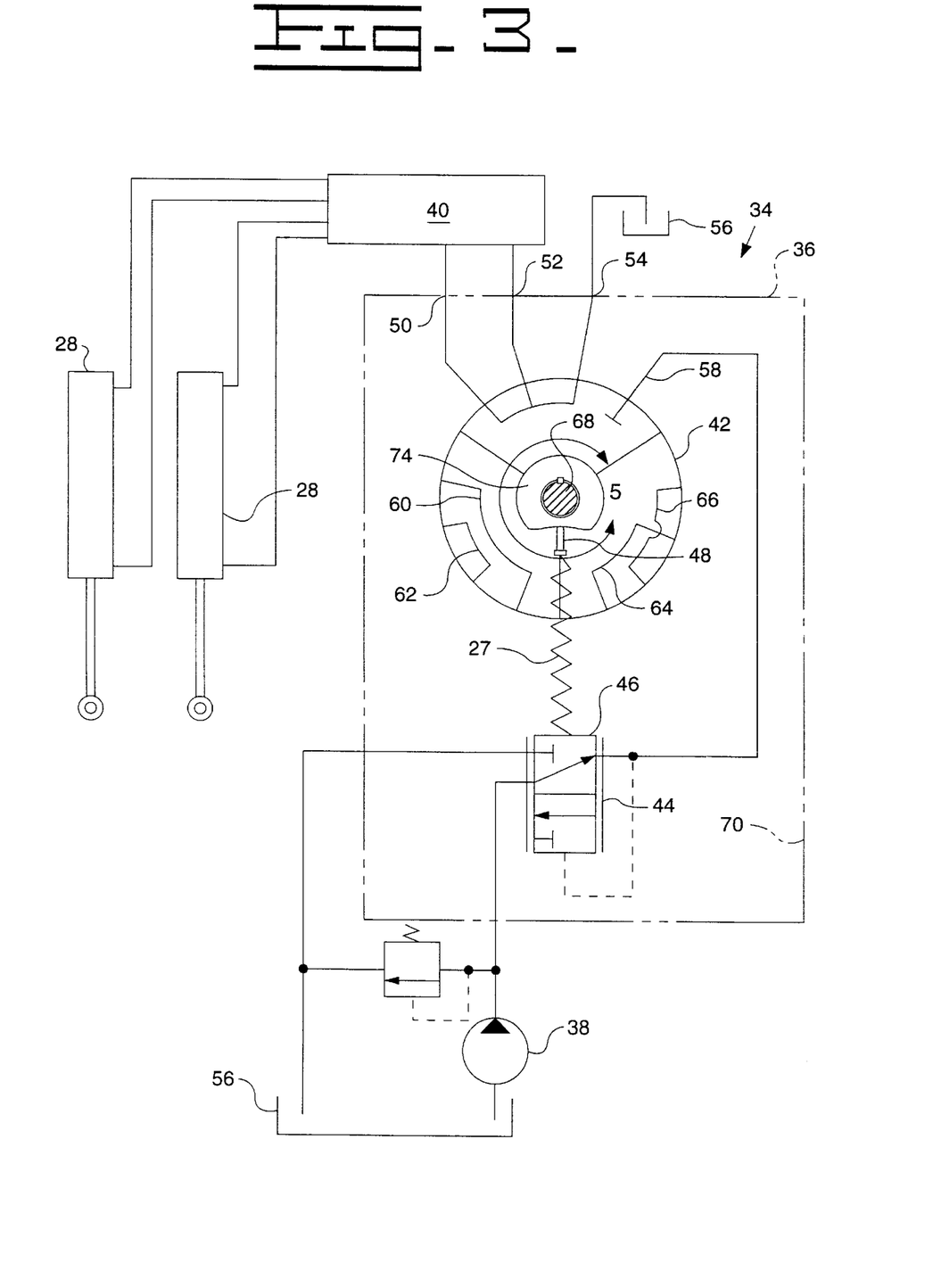
FIG. 3 is a schematic illustration of the control valve of the subject invention.
Figure 4:
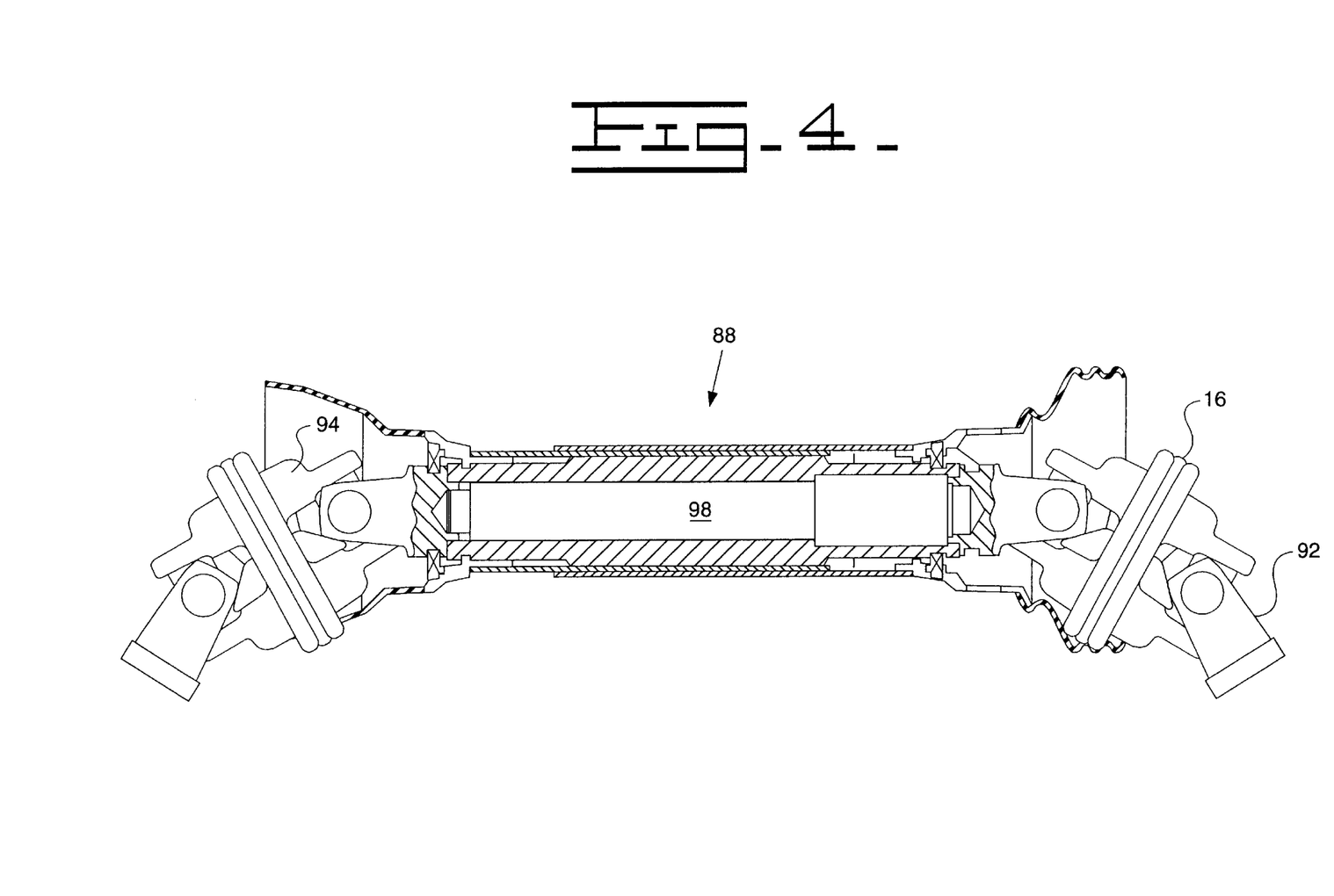
FIG. 4 is a diagrammatic section view of a portion of the shaft assembly taken along lines 4—4 of FIG. 3.
Figure 5:
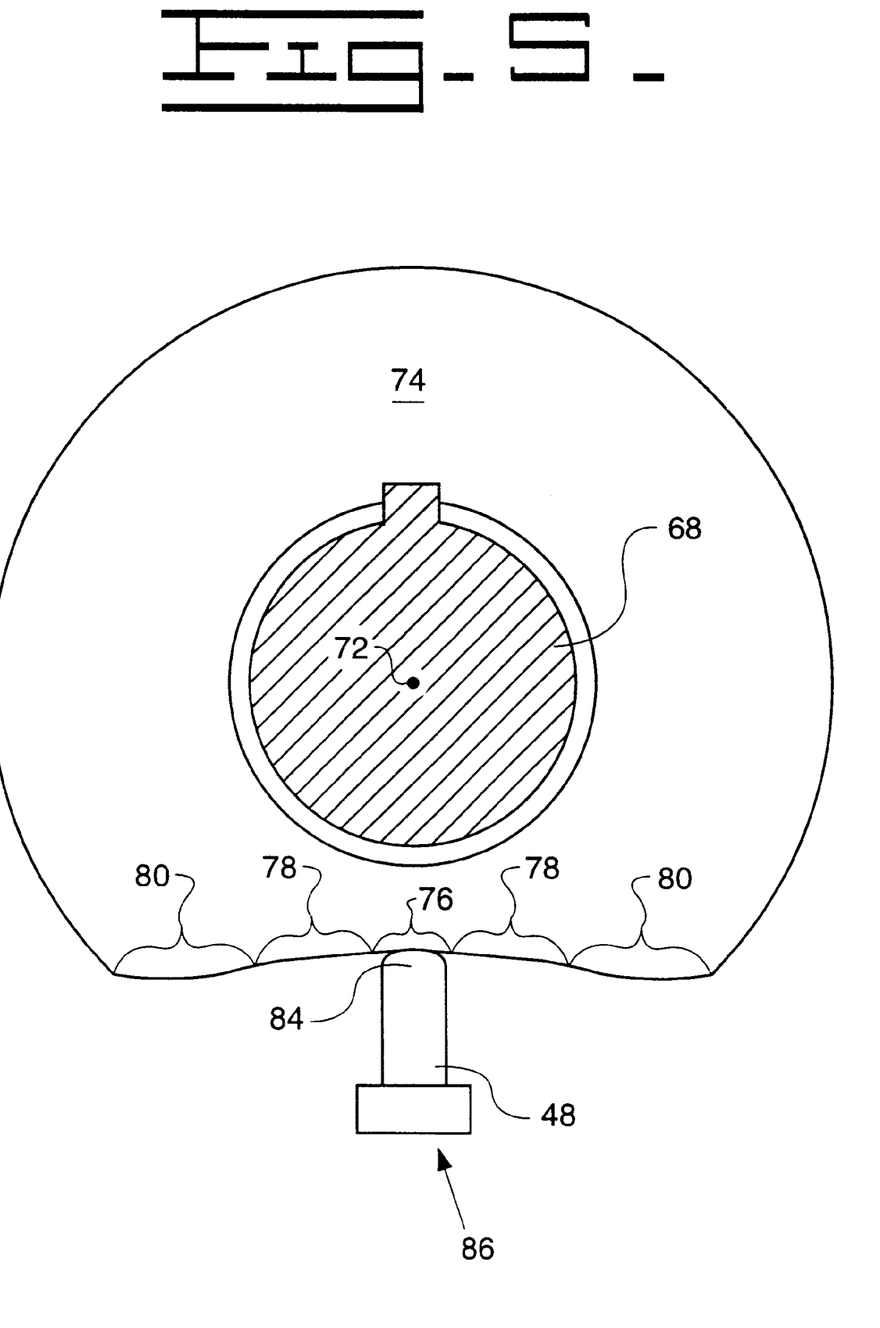
FIG. 5 is a diagrammatic enlargement of the area encircled at 5 in FIG. 2.

Referring to FIGS. 3 and 5, it can be seen that the rotary actuator 42 has a shaft 68 that extends into the valve body 70 for rotation about an axis 72. A cam member 74 is positioned along the axis and is rotatable with the shaft 68. The cam member defines a plurality of operating surfaces that extend substantially along a horizontal plane as viewed in the drawings. The cam member 74 has a centrally disposed neutral portion 76 that is substantially centered beneath the axis 72 as viewed in the drawing. A first operating surface 78 is positioned on opposite sides of the neutral portion and is defined by a preselected radius that is relatively large to provide the first operating surface with a slight curvature. A second operating surface 80 is positioned adjacent each of the first operating surfaces 78 on opposing sides thereof. Each of the second operating surfaces 80 is defined a second preselected radius that is smaller than that of the first operating surface to thereby create a curvature having a greater amount of curvature than the first operating surface.

An actuator 48 in the form of a cam follower, is positioned beneath the cam member 74 and has a first end portion 84 that is engaged with the cam member and a second end portion 86 that is engaged with the pressure regulating valve 44 via a spring 87 (FIG. 3). The actuator 48, in the illustrated embodiment, moves in a linear direction and imparts rectilinear movement of the valve spool 46 as is described above. As the actuator is moved in a linear direction as a result of its contact with the cam member 74, it controls the amount of pressure that is directed to the steering valve, and thus the steering cylinders 28, as well as the rate at which the pressure of the fluid is increased.

Movement of the rotary actuator 42 is imparted by a shaft assembly 88, a first end portion 90 of which is connected to the steering wheel 22 and a second end portion 92 of which is connected to the shaft 68 defined by the rotary actuator 42. The shaft assembly 88 includes a pair of constant velocity (CV) U-joints that are positioned in spaced relation to one another along the shaft assembly. The first end portion 90 of the shaft assembly is positioned in the operators station 20 and extends between the steering wheel 22 and a first CV joint 94. The second portion 92 of the shaft assembly is connected to the shaft 68 defined by the rotary actuator 42 by the a CV joint 96. The two CV joints are interconnected by a third shaft portion 98 that is telescopic to accommodate movement of the second CV joint 96 toward and away from the first CV joint 94 as the second frame 14 is articulated with respect to the first frame 12. In the illustrated embodiment, the both of CV joints are shown to be of the type commonly known as a double Cardan U-joint. It is to be understood however, that another type of CV joint, such as one commonly known as a Rzeppa joint or any one of several commonly known CV joints, could be used in either one or both locations without departing from the intent of the present invention. The important function of the two CV joints is to impart substantially the same amount of rotation between the steering wheel 22 and the rotary actuator 42 regardless of the amount of articulation between the front and rear frames 14 and 12, respectively.

INDUSTRIAL APPLICABILITY

Figure 6:
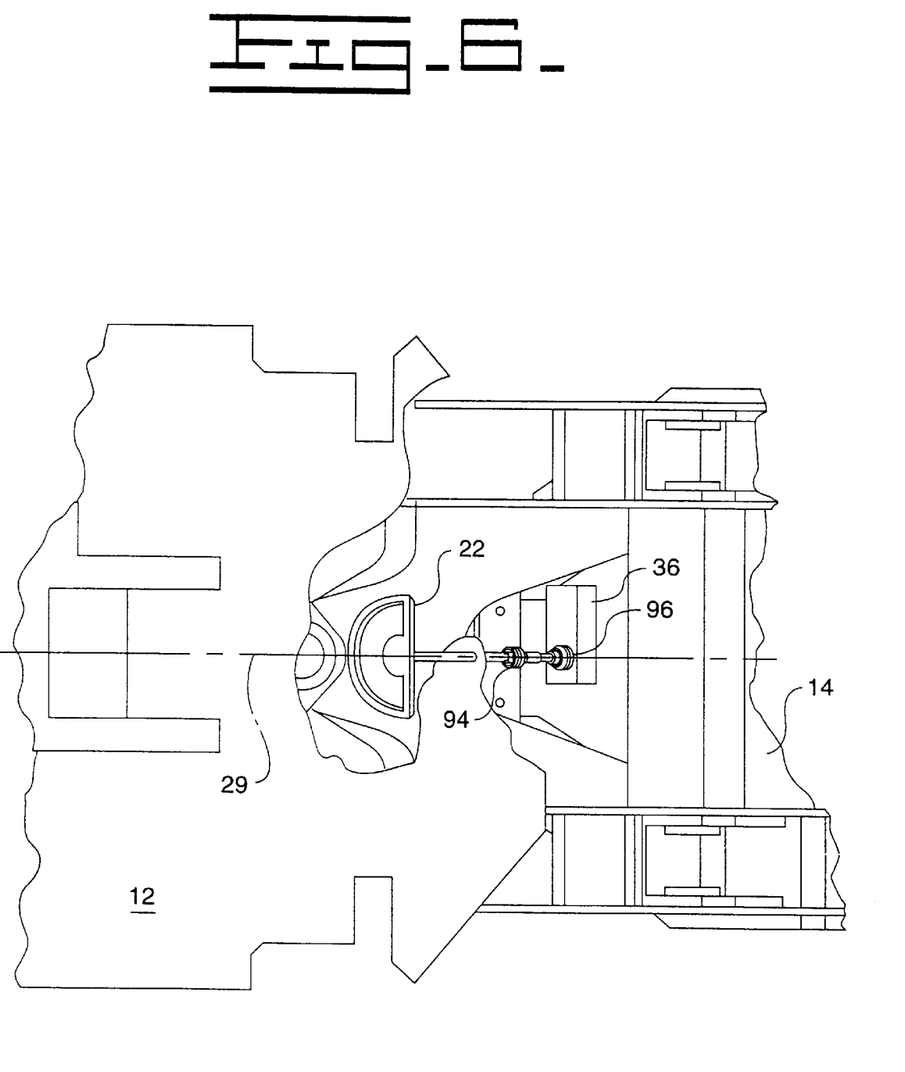
FIG. 6 is a diagrammatic top view of the front and rear frame members showing the positioning of the various components of the steering assembly in the non-articulated position.

The description of the operation of the steering system will begin with the front and rear frame members 12 and 14 substantially centered along the longitudinal centerline 29 which is best shown in FIG. 6. In this position, a flat portion defined by the steering wheel is shown to be generally horizontally oriented and parallel to transverse portions of the front frame 14. Correspondingly, the rotary actuator 42 is in the neutral position with the actuator 48 engaging the central portion 76 of the cam member 74.

Figure 7:
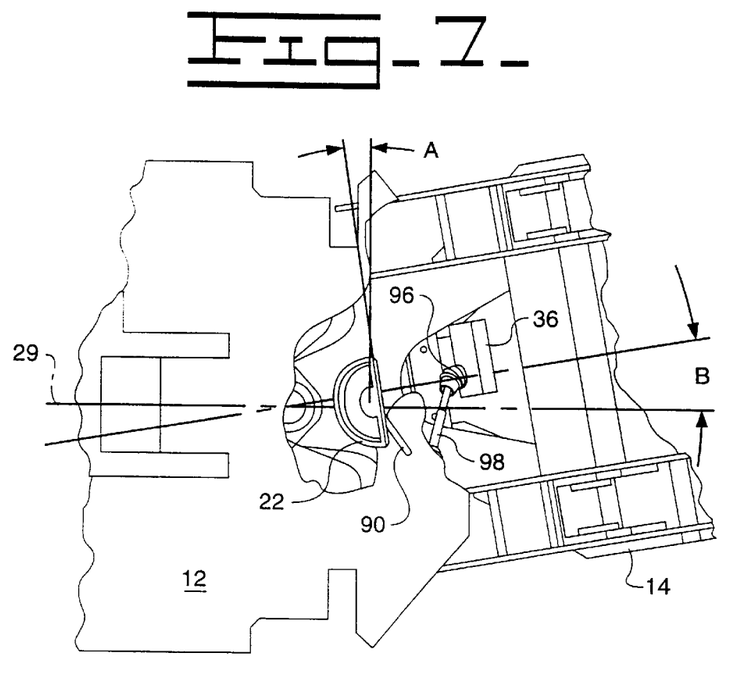
FIG. 7 is a diagrammatic top view of the front and rear frame members, similar to FIG. 6, showing the positioning of the various components of the steering assembly in a first articulated position.

Referring now to FIG. 7, it can be seen that the steering wheel 22 has been rotated in a counterclockwise direction. The amount of rotation is shown to be approximately 10 degrees as is illustrated by the angle "A" that is indicated by a line extending through the flat portion of the steering wheel and intersecting with a transverse line representing the non-rotated position of the steering wheel. Upon initiation of the steering function, i.e. the initial rotation of the steering wheel, the same amount of rotation is translated through the shaft assembly 88 to the rotary actuator 42. This rotates the cam 74, initially, in a counterclockwise direction, as viewed in FIG. 3, the same 10 degrees. This amount of rotation will cause the cam to engage the actuator 48 along the first operating surface 78. When this condition exists, the regulating valve 44 is actuated and pressurized fluid is then directed to the input passage 58. The pressurized fluid will be communicated through flow path 64 to control port 52 while simultaneously communicating the control port 50 with the drain 54 through flow path 66. This directs pressurized fluid to the steering valve 40 which will in turn, control the flow fluid from the main system to the head end of one steering cylinder 28 to cause its extension and the rod end of the other steering cylinder to cause its retraction.

Since the steering wheel has been rotated an amount (10 degrees) that is within the first range of rotation, 0 to 13 degrees, the control valve 36 is operated in the first condition, directing pilot pressure to the steering valve 40 within a range of pressure that falls within 550 to 850 kPa. This first condition is initiated after the steering wheel is rotated more that 2 degrees whereupon the pressure climbs from 0 to 550 relatively quickly. The pilot pressure is typically communicated to the steering valve at a pressure that falls within the range of between 550 and 850 kPa.

Figure 8:
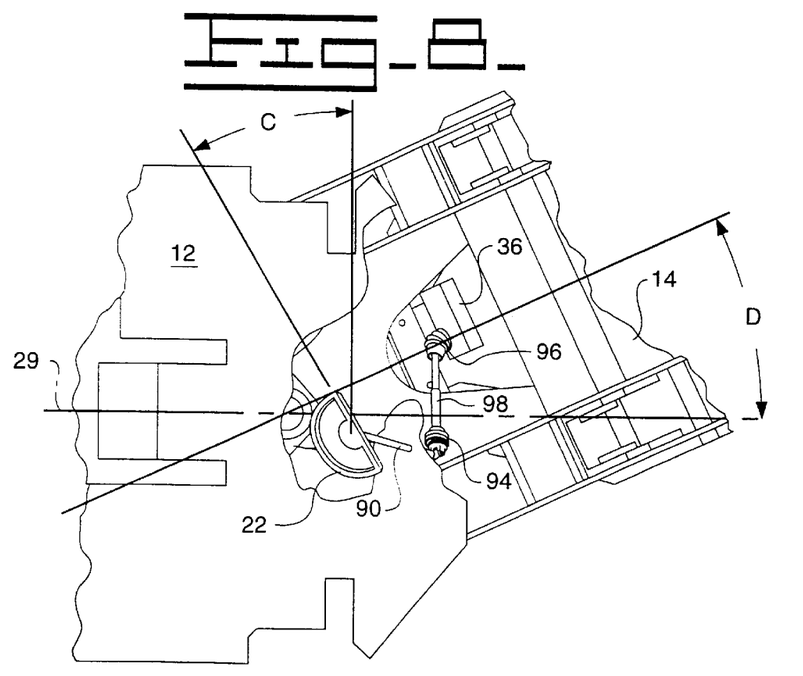
FIG. 8 is a diagrammatic top view of the front and rear frame members showing the positioning of the various components of the steering assembly in a second articulated position.

In the instance wherein the initial amount of steering wheel rotation exceeds 13 degrees, for example as is indicated by angle "C" in FIG. 8, the rotary actuator is rotated an equivalent amount, which is shown to be approximately 25 degrees. With this amount of rotation, the actuator 48 will be placed into engagement with the second operating surface 80. In this condition, the actuator will move the regulating valve 44 to a position wherein pressurized fluid is directed to the steering valve 40 in the same manner previously described, however the range of pressure will fall within 850 to 1925 kPa. In doing so, the front frame is rotated with respect to the rear frame 12 an amount that is substantially equivalent to the 25 degree angle of the steering wheel. This position is indicated by angle "D" in FIG. 8.

Figure 9:
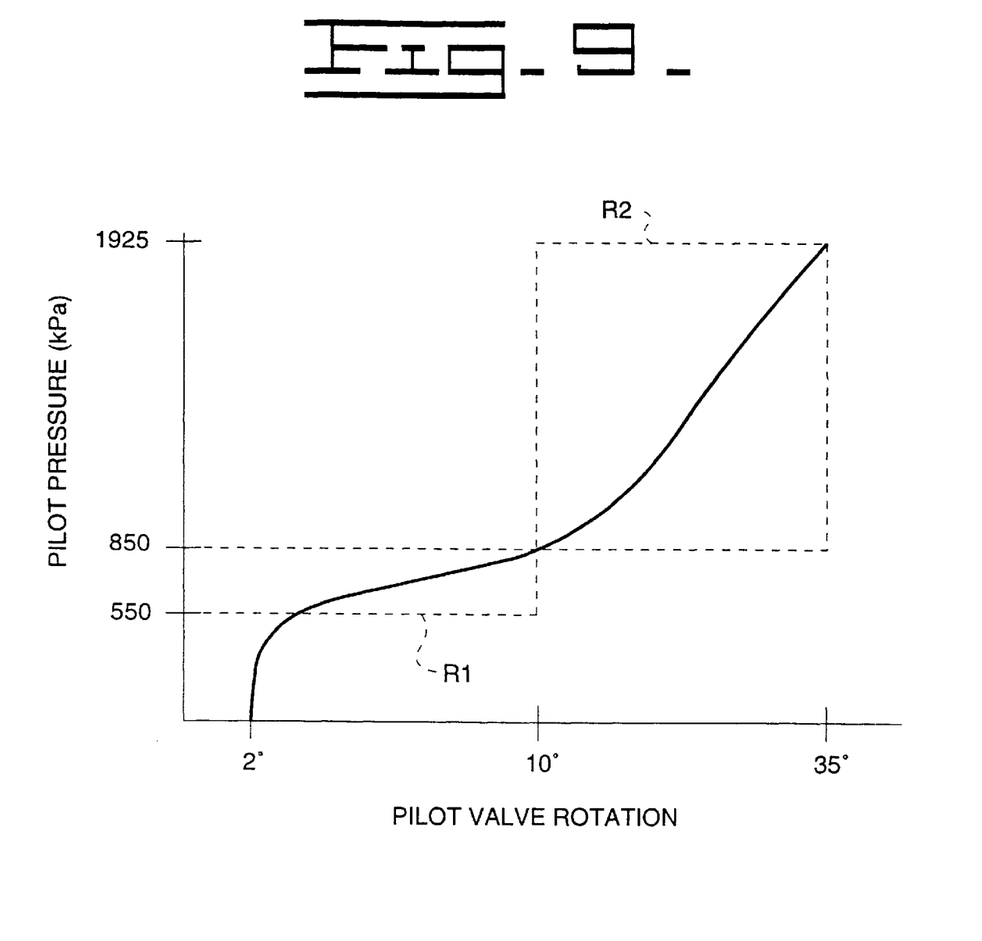
FIG. 9 is a graph, showing the relationship between pilot valve rotation and the pilot pressure directed from the control valve.

As can be seen on the graph illustrated in FIG. 9, the fluid pressure in the second range R2, not only is greater than that of the first range R1 but it also increases at a faster rate over the given range of steering wheel rotation.

It is to be noted that the conditions as described above with respect to the operation of the rotary actuator 42 occur only at the initiation of the steering function. As the front frame 14 starts to rotate with respect to the rear frame 12, the position of the actuator 48 with respect to the cam 74 will change, moving back to the neutral position. This occurs as a result of the positioning of the control valve 36 with respect to the articulation axis 15 and the steering wheel 22. As the front frame 14 starts to move, the control valve will move with it about an arc that is centered on the articulation axis 15. Since the first CV joint is mounted on the first portion 90 of the shaft assembly 88 and is fixed to the rear frame 12, it does not rotate with the movement of the control valve. Because of this, the distance between the two CV joints will increase as the articulation of the frames continues. This variation in distance is accommodated by the telescopic third portion 98 of the shaft assembly 88. Also, since the distance between the second CV joint 96 and the vertical axis 15 is greater than the distance between the two CV joints 94 and 96, the angular relationship between the two CV joints will also change as the front frame pivots. Since the rotary actuator 42 is connected to the steering wheel by a shaft assembly that includes the two CV joints, and since the actuation of the rotary actuator is dictated by the steering wheel, relative rotation between the rotary actuator 42 and the control valve 36 will naturally occur as the front frame articulates. This relative rotation occurs because the interface between the rotary actuator and the control valve is the only connection between the control valve and the steering wheel that is not fixed. Therefore, relative rotation between these components must occur with articulation of the front frame. The direction of the relative rotation is counter to that of the original direction of steering wheel input, therefore as the front frame articulates, the actuator 42 is moved in a direction back toward the neutral portion 76 of the cam 74 to gradually reduce the amount of pressurized fluid to the steering valve as articulation continues and finally closes off communication altogether as the angle of articulation reaches the angle of steering wheel rotation, assuming the steering wheel position has not changed from its initial rotation angle.

Thus it can be seen that with a steering system a set forth above, an articulated machine may be controlled in a very versatile manner. When operating under relatively high speeds such as on a highway, the steering corrections are normally relatively moderate, requiring small rotations of the steering wheel. These types of corrections will cause the control valve to operate in the first condition, providing steering corrections that are relatively smooth and subtle. Conversely, when operating in a truck loading capacity, where the articulation angles between the frames are rather large, the steering corrections require larger degrees of steering wheel rotation. As a result, the control valve will operate in its second condition and the steering corrections will be quicker providing increased frame acceleration which is very desirable when operating in confined quarters. These aspects of the steering system permit a machine to be extremely versatile while at the same time greatly reducing the amount of rotation between the maximum positions of the steering wheel. An additional benefit of the reduced rotation allows various other machine controls, such as transmission controls, to be incorporated into the design of the steering wheel if desired. This incorporation of machine controls can greatly reduce operator fatigue.

Other aspects, objects and advantages of this invention can be obtained from a study of he drawings, the disclosure and the appended claims.

What is claimed is:

1. A steering system adapted for use with an articulated machine having a first and second frame members mounted to one another for pivoting movement relative to one another in response to a movement of at least one fluid actuator connected therebetween, comprising:

a steering control member rotatably mounted on the first frame member;

a control valve mounted on the second frame member, said control valve being operable in one of a first and second condition upon rotation of the steering control member to selectively control the movement of the fluid actuator;

a shaft assembly having a first end portion connected to the steering control member and a second end portion connected to the control valve, said shaft assembly having a pair of constant velocity U-joints interposed between an end portions thereof and being adapted to accommodate the angular change between the two frame members as they are moved with respect to one another and maintain a rotation ratio of approximately 1:1 between the first and second end portions of the shaft assembly.

2. The steering system as set forth in claim 1 wherein the steering control member is a steering wheel.

3. The steering system as set forth in claim 1 wherein the control valve is a pilot valve that provides communication of pressurized fluid to a steering valve to control the movement of the fluid actuator.

4. The steering system as set forth in 3 wherein the pilot valve operates in a first condition wherein the output of pressurized fluid communicated to the steering valve is maintained within a first preselected range of pressure in response to a first preselected range of rotation of the steering control member and a second condition wherein the output of the pressurized fluid communicated to the steering valve is maintained within a second preselected range of pressure during a second preselected amount of rotation of the steering control member, said second range of pressure being greater in amount and rate of increase rise than that of said first range of pressure.

5. The steering system as set forth in claim 4 wherein the pilot valve includes a rotary actuator having a cam member and a linear actuator positioned for engagement with said cam member and being adapted for controlling the amount of pressurized fluid that is directed to the steering valve.

6. The steering system as set forth in claim 5 wherein the cam member defines a central portion, first operating surfaces on each of opposite sides of the central portion, and second operating surfaces positioned adjacent each of the first operating surfaces on an opposite side thereof from the central portion, wherein engagement of said linear actuator with either of the respective first operating surfaces causes operation of the pilot valve in the first condition and engagement of the linear actuator with either of the second operating surfaces causes operation of the pilot valve in the second condition.

7. The steering system as set forth in claim 6 wherein the first and second operating surfaces extend from the central portion in a generally horizontal plane, said first operating surfaces being defined by a radius of a first preselected magnitude and said second operating surface being defined by a radius of a second preselected magnitude that is smaller than that of the first operating surface to create a surface having greater curvature than that of the first operating surface.

8. A steering system for an articulated machine, comprising:
   a first frame member;
   a second frame member pivotally mounted to the first frame member for relative movement with respect thereto;
   at least one fluid actuator connected between the first and second frame members, said fluid actuator being moveable to cause the relative movement between the frame members to provide steering for the machine;
   a steering wheel rotatably mounted on the first frame member;
   a shaft assembly having first and second end portions, said first end portion being connected to the steering wheel;
   a pair of constant velocity U-joints interposed in spaced relationship between said first and second end portions of the shaft assembly; and
   a control valve mounted on the second frame member, said control valve having a rotary actuator adapted for connection to the second end portion of the shaft assembly and being operable in a first condition wherein pressurized fluid is communicated to the fluid actuator within a first preselected range of pressure upon initial rotation of the steering wheel within a first preselected range of rotation and a second condition wherein pressurized fluid is communicated to the fluid actuator within a second preselected range of pressure upon initial rotation of the steering wheel within a second preselected range of rotation.

9. The steering system as set forth in claim 8 wherein a first one of the pair of constant velocity U-joints is connected to the steering wheel by a first portion of the shaft assembly and a second of the pair of constant velocity U-joints is connected to the rotary actuator, said shaft assembly being adapted to translate an amount of rotation to the rotary actuator that is substantially equal to the amount of rotation of the steering wheel throughout the entire range of relative movement between the first and second frame members.

10. The steering system as set forth in claim 8 wherein the rotary actuator has a neutral position wherein no pressurized fluid is communicated to the fluid actuator, said rotary actuator being moveable away from its neutral position as a result of rotational input from the steering wheel to communicate pressurized fluid to the fluid actuator to move the second frame member with respect to the first frame member and wherein the movement of the second frame member with respect to the first frame member will cause the rotary actuator to rotate in a direction, opposite that of said steering wheel input, back toward its neutral position, to gradually reduce and finally eliminate fluid flow to the fluid actuator when the angle of articulation between the first and second frame members substantially equals the angle of rotation of the steering wheel in absence of any additional rotation of the steering wheel.

11. The steering system as set forth in claim 8 wherein the control valve is a pilot valve that communicates pressurized fluid to a steering valve to control the actuation of the fluid actuator.

12. The steering system as set forth in claim 11 wherein the rotary actuator includes a cam portion having a central portion that defines the neutral position of the rotary actuator, a pair of first operating surfaces positioned adjacent the central portion on opposite sides thereof and a second pair of operating surfaces positioned adjacent the first operating surfaces on opposite sides thereof from the central portion.

13. The steering system as set forth in claim 12 wherein the pilot valve includes an actuator having a first end portion adapted for engagement with the cam portion and a second end portion adapted for engagement with a pressure regulating valve to control the amount of pressure communicated to the steering valve.

14. The steering system as set forth in claim 12 wherein said actuator is engageable with 1) the central portion of the cam portion when the rotary actuator, is in its neutral position, 2) the first operating surface when the control valve is being operated in its first condition and 3) the second operating surface when the control valve is being operated in its second condition.

15. A steering system as set forth in claim 11 wherein the first condition of operation of the control valve includes the communication of pilot pressure between the control valve and the steering valve within a range of pressure that is between 0 and 850 kPa during the first preselected range of steering wheel rotation that is between 0 and 13 degrees of rotation, and the second condition of operation of the control valve includes the communication of pilot pressure between the control valve and the steering valve within a range of 850 and 1925 kPa during the second preselected range of steering wheel rotation that is between 14 and 35 degrees of rotation.

16. The steering system as set forth in claim 15 wherein the rate of increase in fluid pressure communicated between the control valve and the steering valve is 850 kPa over the first range of steering wheel rotation and is 1075 kPa over the second range of steering wheel rotation.

17. A steering system for an articulated machine, comprising:
   a first frame member;
   a second frame member pivotally mounted to the first frame member for relative movement with respect thereto;
   at least one fluid actuator connected between the first and second frame members, said fluid actuator being moveable to cause the relative movement between the frame members to provide steering for the machine;
   a steering wheel rotatably mounted on the first frame member;
   a control valve mounted on the second frame member, said control valve having a rotary actuator and being operable in a first condition wherein pressurized fluid is communicated to the fluid actuator within a first range of pressure and a second condition wherein pressurized fluid is communicated to the fluid actuator within a second range of pressure that is greater than that of the first range;
   a shaft assembly having a first portion connected between the steering wheel and a first constant velocity U-joint and a second portion connected to the rotary actuator of the control valve by a second constant velocity U-joint, said shaft assembly being operable to translate rotation of the steering wheel into rotation of the rotary actuator in a manner wherein the amount of rotation of the steering wheel is substantially equal to that of the rotary actuator.

18. The steering system as set forth in claim 17 wherein the first frame member and the second frame member pivot with respect to one another about a substantially vertically oriented axis.

19. The steering system as set forth in claim 18 wherein a pair of fluid actuators are connected between the first and second frame members and are positioned on opposite sides of the axis.

20. The steering system as set forth in claim 17 wherein the pressure of the fluid communicated between the control valve and a steering valve in a manner wherein said pressure increases between 0 and 850 kPa during the first condition of control valve operation and between 850 and 1925 kPa during the second condition of control valve operation.

21. The steering system as set forth in claim 18 wherein the first constant velocity U-joint is positioned on the first frame member a fixed distance from the pivot axis and the second constant velocity U-joint is positioned adjacent control valve mounted on the second frame member a distance from the pivot axis that varies as the second frame rotates with respect to the first frame, said first and second U-joints being connected by a portion of the shaft assembly that is telescopic to accommodate movement of the second U-joint in a direction toward and away from the first U-joint in response to relative movement between the first and second frame members.

22. The steering system as set forth in claim 21 wherein the first and second constant velocity U-joints are double Cardan U-joints.

* * * * *